United States Patent [19]

Coupek et al.

[11] 4,135,892

[45] Jan. 23, 1979

[54] MACROPOROUS POLYMERIC SORBENTS FOR CHROMATOGRAPHY, ESPECIALLY GAS CHROMATOGRAPHY OF ORGANIC COMPOUNDS

[75] Inventors: Jiří Čoupek; Jaromír Lukáš; Jiří Hradil; Miroslava Křiváková, all of Prague, Czechoslovakia

[73] Assignee: Ceskoslovenska akademie ved, Prague, Czechoslovakia

[21] Appl. No.: 705,422

[22] Filed: Jul. 15, 1976

[51] Int. Cl.$^2$ ............................................. B01D 15/08
[52] U.S. Cl. ............................................. 55/67; 55/386
[58] Field of Search ............ 210/31 C, 198 C; 55/67, 55/386; 252/426; 526/320, 321

[56] References Cited

U.S. PATENT DOCUMENTS

| | | | |
|---|---|---|---|
| 3,458,976 | 8/1969 | Hollis | 55/386 |
| 3,478,886 | 11/1969 | Hornbeck | 210/198 C |
| 3,808,125 | 4/1974 | Good | 55/67 X |
| 3,891,412 | 6/1975 | Dave | 55/67 |
| 3,925,267 | 12/1975 | Coupek et al. | 526/320 X |

FOREIGN PATENT DOCUMENTS

2300931  8/1973  Fed. Rep. of Germany ....... 210/198 C

*Primary Examiner*—John Adee

[57] ABSTRACT

The invention relates to macroporous polymeric sorbents prepared by ternary copolymerization of polar monomers, namely hydroxyalkyl acrylates and methacrylates (hydroxyalkyl $C_{1-6}$), in the amount of 1 – 70 wt.%, with 30 – 90 wt.% of nonpolar comonomers, namely alkyl acrylates and methacrylates (alkyl $C_{1-18}$), and 20 – 80 wt.% of crosslinking agents, namely alkylene diacrylates and dimethacrylates (alkylene $C_{1-6}$). The sorbents were prepared by the suspension copolymerization in the presence of inert organic solvents and surfactants in the single step without further chemical modification and their polarity was controlled in a broad region. They are especially suitable for gas-chromatographic separation of organic compounds, as hydrocarbons, alcohols, organic acids and nitrogen-containing heterocyclic compounds. Their preparation in one step is more simple and economical than modification of the polymeric matrix by polymeranalogous reactions which has been used for this purpose until present time.

5 Claims, No Drawings

MACROPOROUS POLYMERIC SORBENTS FOR CHROMATOGRAPHY, ESPECIALLY GAS CHROMATOGRAPHY OF ORGANIC COMPOUNDS

The invention relates to polymeric sorbents prepared by the ternary copolymerization of polar monomers with non-polar comonomers and crosslinking agents which are suitable above all for gas chromatography.

Organic macroporous copolymers were applied as sorbents besides other chromatographic methods also in the chromatography gas-solid. A number of successful analytical applications is recently known for this type of commercially available materials. However, theis mostly nonpolar character limits the usage only for the certain class of compounds.

The changes in polarity of macroporous copolymers are mostly achieved by chemical polymeranalogous reactions, which affect above all the inner surface of pores of the organic sorbents. If the fundamental polymeric carrier is, for example, the copolymer of styrene with divinylbenzene, the chemical transformation may somewhat increase its polarity (majority of sorbents of the Porapak ® type). However, these sorbents are not entirely suitable for separation of the polar compounds even after that.

Some progress was achieved by application of the more polar polymeric matrix, which is formed in the suspension copolymerization of monomers comprising hydroxyl groups and the subsequent chemical transformation of these carriers, e.g. by acrylation, silylation, cyanoethylation, and the like, according to the Czechoslovak Pat. No. 159,990. The resulting materials are noted for their remarkable region of polyrities defined according to Rohrschneider (L. Rohrschneider; J. chromatogr. 1966, 22,6) and the excellent separation efficiency. However, the preparation of the sorbent proceeds in two steps, polymeranagogous transformations require very precise maintaining of reaction conditions to obtain production batches with reproducible properties and, in some cases, the reacting components are expensive.

The objective of the invention are macroporous polymeric sorbents for chromatography, namely for gas chromatography of organic compounds, as hydrocarbons, alcohols, organic acids, nitrogen containing heterocyclic compounds, and the like, which consist of ternary copolymers with one component being the monomer containing hydroxyl groups and selected from the group comprising hydroxyalkyl acrylates and hydroxyalkyl methacrylates, where hydroxyalkyl contains 1 to 6 carbon atoms, in the amount 1–70 wt.%, the further component being alkyl acrylate or alkyl methacrylate, where alkyl contains 1 to 18 carbon atoms, in the amount 30–90 wt.%, and the third component being the crosslinking agent selected from the group comprising alkylene diacrylates and alkylene dimethacrylates, where alkylene contains 1 to 6 carbon atoms, in the amount 20–80 wt.%.

These macroporous sorbents are advantageously prepared by the ternary copolymerization of the monomer containing hydroxyl groups and selected from the group comprising hydroxyalkyl acrylates and hydroxyalkyl methacrylates, with the hydroxyalkyl group containing 1 to 6 carbon atoms, with alkyl acrylate or alkyl methacrylate, with the alkyl group containing 1 to 18 carbon atoms, and the crosslinking agent selected from the group comprising alkylene diacrylates and alkylene dimethacrylates, with alkylene containing 1 to 6 carbon atoms, under stirring in an aqueous disperse medium in the presence of an initiator of radical polymerization which is soluble in the organic phase and selected from the group comprising diacylperoxides and aliphatic azobisnitriles, suspension stabilizers, as polyvinylpyrrolidone, polyvinylalcohol, partially hydrolyzed poly(vinyl acetate), starch, or mixtures of these compounds, and in the presence of inert organic components selected from the group comprising aliphatic and cycloaliphatic alcohols which contain 4–18 carbon atoms in the molecule.

The changes of physical and physicochemical properties of the polymers may be achieved by copolymerization with the third monomer which influences the polarity of their inner surface and, in this way, also their chromatographic behavior proportinally to its content in the final product. Besides affecting the chemical character of surface, the materials with considerably high values of specific surface area can be prepared in the form of spherical particles under suitable reaction conditions. As it is shown above, the sorbents is prepared in the single reaction step and does not require any further chemical transformation before its chromatographic application, besides the usual finishing operations after reaction (washing, extraction, drying). The manufacturing of sorbents is considerably facilitated in this way because several time-consuming and often also expensive technological operations are omitted.

Mechanical stability, heat resistance and pore dimensions are similar to fundamental hydroxyalkyl methacrylate binary copolymers. Thermal resistance of the copolymers expressively increased in some cases by introducing the third monomer into the polymeric matrix. Also the separation efficiency of packings prepared according to this invention expressively improved, namely for separation of nitrogen-containing heterocyclic compounds, cycloaliphatic and aromatic hydrocarbons, unsaturated hydrocarbons, alcohols, organic acids, and the like. Considering that one of the monomers, providing by copolymerization the materials according to this invention, contains hydroxyl groups, the subsequent polymeranalogous modifications are possible, if they are desirable. The examples follow which illustrate the scope of this invention without, however, limiting it by any means.

EXAMPLE 1

A mixture of 14.0 g of hydroxyethyl methacrylate, 49.8 g of ethylene dimethacrylate and 17.8 g of methyl methacrylate was polymerized in the presence of 58.5 g of cyclohexanol, 50 g of dodecanol and 0.117 g of azobisisobutyronitrile in 600 ml of distilled water containing 6 g of dissolved polyvinylpyrrolidone (BASF., mol. wt. 1,200,000) at the temperature 70° C. for 12 hours under vigorous stirring. The resulting copolymer was repeatedly decanted with water and ethanol, dried, fractionated on sieves and then extracted for 10 hours with benzene and dried. The glass column of inner diameter 3 mm and 1200 mm long was packed with 2.2595 g of the obtained polymer with particle size 100–200 $\mu$m and the specific surface area 105 m$^2$/g. The determined maximum operation temperature of the column was 220° C. Rohrschneider's coefficients of this polymer sorbents were: $x = 0.67$, $y = 2.05$, $z = 1.85$, $u = 2.63$, $s = 1.63$. A mixture of nitrogen-containing heterocyclic compounds was successfully separated in this column at the column temperature 185° C. and the carrier gas flow rate 25 cm³/min (the analysis lasted 27 min). The relative retention time: pyridine 1, α-picoline 1.39, γ-picoline 1.85, β-picoline 2.05.

EXAMPLE 2

A mixture of 25.78 g of hydroxyethyl methacrylate, 48.95 g of ethylene dimethacrylate, 6.85 g of methyl methacrylate, 108.3 g of cyclohexanol and 0.117 g of azobisisobutyronitrile was polymerized under stirring in 600 ml of distilled water which contained 6 g of polyvinylpyrrolidone. The copolymer was worked out in the same way as in Example 1. Spherical particles 100–200 μm were used for packing the column 1200 mm long of diameter 3 mm (4.6249 g). The polymeric sorbent had the specific surface area 176 m²/g, the maximum operation temperature 230° C., and exhibited the Rohrschneider's constants $x = 0.68$, $y = 2.38$, $z = 2.06$, $u = 2.77$ and $s = 2.06$. The mixture of cyclohexane, cyclohexene and benzene was separated in this column at the column temperature 154° C. and 26 cm³/min of argon as the carrier gas. While the separation efficiency for cyclohexane - cyclohexene was $R = 0.86$, benzene was completely separated from both remaining components. The analysis lasted 10.5 min and the relative retention periods were: cyclohexane 1, cyclohexene 1.26, benzene 1.78. Cyclanes were separated from the corresponding aromatic hydrocarbons under the same conditions with the above column packing. The relative retention time: cyclohexane 1, methylcyclohexane 1.56, ethylcyclohexane 3.10, benzene 1.78, toluene 3.43 and ethylbenzene 6.01.

EXAMPLE 3

The polymerization was carried out analogously to Example 1 with the same amounts of individual components, under the same reaction conditions and processing of the polymeric macroporous sorbent. A mixture of alcohols was separated in the column described in Example 2 at the column temperature 175° C. and the flow rate of argon 25 cm³/min. The analysis lasted 27 minutes. The relative retention time related to methanol: methanol 1, ethanol 1.46, isopropylalcohol 1.85, n-propanol 2.59, tert-butanol 3.33, isobutanol 3.93, n-butanol 4.84, isoamylalcohol 7.94, n-amylalcohol 9.02.

EXAMPLE 4

The polymerization, sorbent preparation and column packing were carried out analogously to Example 2. A mixture of fatty acids was separated at the column temperature 175° C. and the flow rate of argon 25 cm³/min. The analysis lasted 65 min. The relative retention periods: water 0.19, formic acid 1, acetic acid 1.24, propionic acid 2.05, isobutyric acid 2.96, butyric acid 3.74.

EXAMPLE 5

A mixture of 7.16 g of 2-hydroxyethyl methacrylate, 71.80 g of ethylene dimethacrylate and 8.81 g of methyl methacrylate was polymerized in the presence of 98.55 g of cyclohexanol and 9.75 g of dodecanol; other reaction conditions and polymer processing were the same as in Example 1. The sorbent of particle size 200–300 μm exhibited the specific surface area 105 m²/g, maximum operation temperature 200° C., and the Rohrschneider's constant $x = 0.88$, $y = 2.24$, $z = 1.98$, $u = 2.97$ and $s = 1.96$. The column 1200 × 3 mm was packed with 3.3361 g of the copolymer. The following mixture was separated at 175° C. and the flow rate of argon 25 cm³/min with the given relative retention time: water 0.18, formic acid 1, acetic acid 1.23, propionic acid 2.26, isobutyric acid 3.27 and butyric acid 4.05; the analysis lasted 45 min.

EXAMPLE 6

A mixture consisting of 0.97 g of 2-hydroxyethyl methacrylate, 71.8 g of ethylene dimethacrylate, 8.81 g of methyl methacrykate, 98.55 g of cyclohexanol, and 9.75 g of dodecanol was polymerized at the conditions described in Example 1. The column 1200 × 3 mm was packed with 2.3209 g of the copolymer of grain size 200–300 μm with the specific surface area 521 m²/g and the maximum operation temperature 240° C. The Rohrschneider's constants had the following values: $x = 0.11$, $y = 1.05$, $z = 1.01$, $u = 1.41$, $s = 0.30$. A mixture of hydrocarbons was separated at the column temperature 125° C. and the flow rate of argon 35 cm³/min and tha analysis lasting 28 min. The following relative retention time was found: 1-pentene 1, cyclopentane 1.13, trans-1,3-pentadiene 1.44, 3,3-dimethyl-1-butene 1.78, cis-4-methyl-2-pentene 2.3, 1-hexene 3.05.

EXAMPLE 7

The polymer and column were prepared according to Example 6. The analysis of hydrocarbons under the same chromatographic conditions as in Example 6 lasted 33 min and the relative retention time were as follows: 1-pentene 1, -n-pentane 1.12, 1-hexene 2.52, hexane 2.76.

EXAMPLE 8

A mixture of 14 g of 2-hydroxyethyl methacrylate, 49.77 g of ethylene dimethacrylate, 17.82 g of methyl methacrylate and 108 g of cyclohexanol was polymerized in the same way as in Example 1 under the same reaction conditions and processing conditions of the polymer. The sorbent of grain size 100–200 μm and the specific surface area 158 m²/g had the maximum operation temperature 220° C. and exhibited the following Rohrschneider's constants: $x = 0.85$, $y = 2.36$, $z = 2.08$, $u = 2.96$, $s = 2.06$. This ternary copolymer (3.4566 g) was packed into the column 1200 × 3 mm which was then used for separation of a hydrocarbon mixture at 150° C. and the flow rate of carrier gas 25 cm³/min. The relative retention time: pentane 1, hexane 1.93, heptane 3.72, octane 7.43, nonane 15.06. The analysis lasted 31 min.

EXAMPLE 9

A mixture of 14.0 g of 2-hydroxyethyl methacrylate, 50 g of ethylene dimethacrylate, 18 g of octadecyl methacrylate, 108 g of cyclohexanol and 0.100 g of dibenzoyl peroxide was polymerized at the conditions given in Example 1 in 600 ml of water which contained 15 g of polyvinylpyrrolidone (BASF, mol.wt. 1,200,000) and 10 g of starch. The resulting polymer was fractionated and used as a column packing for separation of hydrocarbons.

EXAMPLE 10

The polymerization was carried out analogously to Example 9 with the distinction that methyl methacrylate was used instead of 2-hydroxyethyl methacrylate and 15 g of polyvinylalcohol (mol.wt. 50,000) as the stabilizer. The copolymer was fractionated and used as

EXAMPLE 11

A mixture of 25 g of 2-hydroxyethyl methacrylate, 66,5 g of hexamethylenediol dimethacrylate and 10 g of 2-ethylhexyl methacrylate was polymerized under the same conditions of reaction and polymer processing as in Example 9. The copolymer of grain size 100–200 μm was used for separation of hydrocarbon mixtures.

EXAMPLE 12

A mixture of 7.45 of 2-hydroxyethyl acrylate, 71.8 g of hexamethylenediol dimethacrylate and 8.8 g of butoxyethyl acrylate was copolymerized under the same conditions of reaction and polymer processing as in Example 5. The copolymer of grain size 100–200 μm was used in the column 1200 × 3 mm for separation of a mixture of alcohols similarly as in Example 3.

We claim:

1. The method of separating mixtures of organic compounds selected from the group consisting of mixtures of nitrogen-containing heterocyclic compounds, mixtures of cycloaliphatic and aromatic hydrocarbons, mixtures of aliphatic hydrocarbons, mixtures of lower aliphatic alcohols and mixtures of lower fatty acids which comprises passing such a mixture with a carrier gas through a column at a column temperature of 125°–185° C., said column being packed with a macroporous polymeric sorbent, which is a terpolymer of:
   (a) 1.19–31.60 wt.% of a hydroxyl containing monomer selected from the group consisting of hydroxyalkyl acrylates and hydroxyalkyl methacrylates in which the alkyl group contains 1–6 carbon atoms;
   (b) 8.39–21.95 wt.% of a monomer selected from the group consisting of alkyl acrylates and alkyl methacrylates in which the alkyl group contains 1–18 carbon atoms; and
   (c) 60.01–88.02 wt.% of a crosslinking monomer selected from the group consisting of alkylene diacrylates and alkylene dimethacrylates in which the alkylene group contains 1–6 carbon atoms.

2. The method of claim 1 in which said sorbent has a particle size of 100–300 μm and a specific surface area of 105–521 m$^2$/g.

3. The method of claim 1 in which monomer (a) of said terpolymer is hydroxyethyl methacrylate.

4. The method of claim 1 in which monomer (b) of said terpolymer is selected from the group consisting of methyl methacrylate, 2-ethylhexyl methacrylate and octadecyl methacrylate.

5. The method of claim 1 in which monomer (c) of said terpolymer is selected from the group consisting of ethylene dimethacrylate and hexamethylenediol dimethacrylate.

* * * * *